United States Patent
Meruva et al.

(10) Patent No.: US 11,584,546 B2
(45) Date of Patent: Feb. 21, 2023

(54) AIRPORT GATE VISUAL DOCKING GUIDANCE SYSTEM DIGITAL TWIN

(71) Applicant: Honeywell International Inc., Charlotte, NC (US)

(72) Inventors: Jayaprakash Meruva, Bangalore (IN); Rajesh V. Poojary, Bangalore (IN); Sachin Kumar S., Kerala (IN); Ganapati Hegde, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 279 days.

(21) Appl. No.: 17/104,041

(22) Filed: Nov. 25, 2020

(65) Prior Publication Data

US 2022/0161942 A1    May 26, 2022

(51) Int. Cl.
*B64F 1/18*    (2006.01)
*G06F 9/445*    (2018.01)
(Continued)

(52) U.S. Cl.
CPC ............ *B64F 1/18* (2013.01); *G06F 9/44505* (2013.01); *G06F 21/602* (2013.01); *H04L 67/125* (2013.01)

(58) Field of Classification Search
CPC ...... B64F 1/18; G06F 9/44505; G06F 21/602; G06F 9/4401; H04L 67/125; G08G 5/0082; G08G 5/065; G08G 5/0026
See application file for complete search history.

(56) References Cited

U.S. PATENT DOCUMENTS 6,542,086 B2 * 4/2003 Baumgartner .......... B64F 1/002
                                                          244/114 R
10,234,303 B1 * 3/2019 Chandrashekarappa .....................
                                                          G01C 21/3635
(Continued)

FOREIGN PATENT DOCUMENTS

CN            206194148        5/2017

OTHER PUBLICATIONS

Extended European Search Report for related European Application No. 21207999.0, dated May 2, 2022 (11 pgs).

(Continued)

*Primary Examiner* — Joseph H Feild
*Assistant Examiner* — Rufus C Point
(74) *Attorney, Agent, or Firm* — Brooks, Cameron & Huebsch, PLLC

(57) ABSTRACT

Airport gate visual docking guidance system digital twin methods, systems, and devices are described herein. One method includes: identifying that a device of the visual docking guidance system is non-responsive, determining which device is non-responsive, initiating start-up of one visual docking guidance system program selected from: a visual docking guidance system software program, a central computing system program, or an operating station program, selecting a digital twin data set corresponding to the device of the visual docking guidance system that was non-responsive, wherein the set includes parameter data that was customized by a user of the visual docking guidance system and is particular to the device of the visual docking guidance system that was non-responsive, and sending the digital twin parameter data to the device of the visual docking guidance system that was non-responsive to update one or more parameters stored in association with the visual docking guidance system program.

20 Claims, 2 Drawing Sheets

(51) Int. Cl.
  *G06F 21/60* (2013.01)
  *H04L 67/125* (2022.01)

(56) References Cited

U.S. PATENT DOCUMENTS

| | | | | |
|---|---|---|---|---|
| 10,384,805 | B2* | 8/2019 | Håkansson | G01S 17/42 |
| 2003/0069648 | A1* | 4/2003 | Douglas | G05B 23/0272 340/568.1 |
| 2008/0098538 | A1* | 5/2008 | Hutton | B64F 1/3055 14/71.5 |
| 2015/0032870 | A1* | 1/2015 | Lee | H04L 12/2823 709/221 |
| 2015/0276427 | A1* | 10/2015 | Lin | B64D 47/08 340/973 |
| 2016/0225266 | A1* | 8/2016 | Kang | G08G 5/0082 |
| 2019/0106223 | A1* | 4/2019 | Håkansson | G08G 5/0026 |
| 2019/0344906 | A1* | 11/2019 | Håkansson | G08G 5/0026 |
| 2020/0090532 | A1* | 3/2020 | Håkansson | G08G 5/003 |
| 2020/0310394 | A1* | 10/2020 | Wouhaybi | G06F 8/65 |

OTHER PUBLICATIONS

Safegate Group : "SAFEDOCK Manual"; Chapter 4, "Maintenance", paragraphs 4-6 "Replacement of Malfunctioning Units"; Feb. 6, 2015 (348 pgs).

Caldwell, et al., "Minimalist Recovery Techniques for Single Event Effects in Spaceborne Microcontrollers" Dependable Computing for Critical Applications, Jan. 8, 1999 (19 pgs).

\* cited by examiner ary operator station. An operator can login via this operator station to check the current state of the visual docking guidance system. If desired, they can initiate a command to bring back a particular visual docking guidance system (for any of the gates) to a previous state based on the digital twin state available for the visual docking guidance system.

AIRPORT GATE VISUAL DOCKING GUIDANCE SYSTEM DIGITAL TWIN

TECHNICAL FIELD

The present disclosure relates to an airport gate visual docking guidance system digital twin.

BACKGROUND

Airports have increasingly been adopting systems generally referred to as visual docking guidance systems (VDGS) to manage aircraft on the ground and gate area functions. Each visual docking guidance system unit/device includes an sensor data processing unit, a docking controller, a display unit, and at least one video, RADAR, and/or LIDAR sensor.

Typically, one visual docking guidance system is deployed per airport gate. Central computing system software connects to the docking controller to determine the status of the gate and to send docking schedules and manual control commands to the gate area.

One concern in a visual docking guidance system is that the ability to bring the visual docking guidance system up and running are very time consuming tasks. This can occur, for example, in case of system failures and replacement of visual docking guidance system units, in case of system software upgrades, or regular software maintenance activities There are various reasons that this may occur, for instance: a loss of configuration of various visual docking guidance system sub-systems when the system fails or there might be records/details manually maintained in the system, but these details are not updated when certain parameters are changed in a sub-system. Further, the configuration data of each of the sub-systems and rules defined for gate operations are typically required for the central computing system to maintain communication with visual docking guidance systems and perform normal functionality.

Even though redundant servers are available for central computing system software, some configuration and calibration information related to a visual docking guidance device or unit is not maintained in the central computing system software as those details are very specific to visual docking guidance system sub-systems. Further, in certain airports, due to cost constraints, they do not utilize redundant serves. In that case, any failure in the central computing system will lead to huge downtime if the central computing system is not restored quickly.

Assuming that there is a scenario where visual docking guidance system at a particular gate is not working and that the visual docking guidance system hardware needs to be completely replaced, after changing to a new visual docking guidance system hardware unit, a technician must bring back the system to the same normal state that it was before by configuring all necessary things properly for that gate. The technician must be clear on what the configuration of the system was before it failed and ensure it is brought back to the same state. This process and accountability can be difficult and time-consuming tasks and may lead to down time of the gate. This is an additional cost to airport operations.

DETAILED DESCRIPTION

Figure 1:
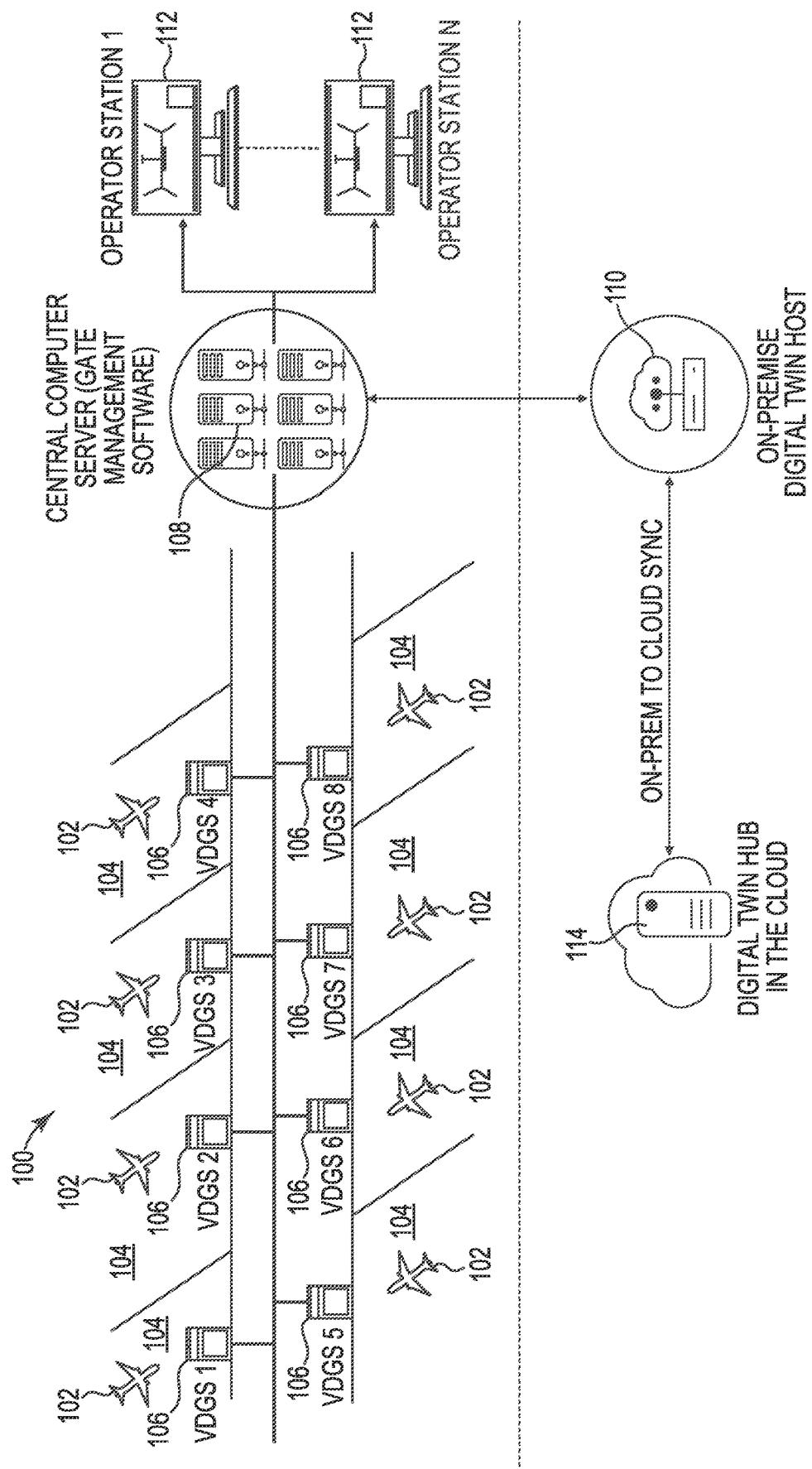
FIG. 1 illustrates a component view of a visual docking guidance system accordance with one or more embodiments of the present disclosure.

In the present disclosure, a visual docking guidance system digital twin structure is proposed which can be executed in the central computing system or in a separate on-premise (airport) computing device that pulls out the various sub-system state and configuration details and creates an information data model of the system and maintains it for speedy recovery. The information data model includes, all system configuration details, network topology, application configuration details, and state information of each of the visual docking guidance system units, the central computing system, and operator station. The application configuration details can, for example, include the details related to communication and networking details, digital certificates, airport stand layout three dimensional (3D) configurations, stop bar configuration, association of supported aircraft model, docking workflow algorithm configuration for each visual docking guidance system unit, obstacle detection rules, wing tip collision rules, stand centerline adjustment parameters, sensor calibration and/or adjustment parameters, gate system equipment configurations, digital IO pin configurations, NTP/master clock server configurations, and/or other customized settings that may be lost when the visual docking guidance system unit is reconfigured.

Whenever some sub-systems of a visual docking guidance system fail or replacement of some visual docking guidance system units takes place, an operator will select the previous visual docking guidance system unit's digital twin via the digital twin agent and initiate a command to restore the parameters from the selected digital twin. The digital twin system will upload the necessary details to bring the system to normal operation.

In prior art systems, this may take several hours which can be reduced to a few minutes through use of the embodiments of the present disclosure. Each visual docking guidance system sub-system (e.g., visual docking guidance system units, the central computing server, operator stations) can also have digital twin agent software which can help in capturing these configuration updates whenever there is a change in the system state.

For example, in some embodiments, at least one of the visual docking guidance system units, the central computing server or operator stations includes a second digital twin agent. This second digital twin extracts data that is to be part of the digital twin parameter data set on the first digital twin agent from the device, server, or unit on which the second digital twin agent resides.

The second digital twin agent can also assist in installing the parameter data. For example, the second digital twin agent can include computer executable instructions to receive the digital twin parameter data set from the first digital twin agent and install the digital twin parameter data set on the device, server, or unit on which the second digital twin agent resides. The executable instructions can be stored in memory and executed by a processor of the device, server, or unit on which the second digital twin agent resides.

The information can be protected using encryption and digital signatures technologies so that, at-rest, this information will not be tampered with by any malicious users. The overall digital twin of each sub-system can be represented as a model and this model can be either maintained in an on-premise server or in a remote server (e.g., cloud) if the airport allows data to be maintained remotely.

This solution provides an extra advantage by replacing a faulty and/or legacy (i.e., being phased out due to the device no longer being upgradable) physical device with a new hardware device without much commissioning effort, with quick turnaround time, and/or low cost. Embodiments of the present disclosure also enable remote commissioning from a remote service location after replacing the hardware components on the premises.

A visual docking guidance system unit includes a large display provided at the gate that provides a variety of information to the ground crew/flight crew workers at that particular gate. For example, some information types can include information from cameras and sensors at the gate area that detect aircraft to identify position, movement, orientation, and/or aircraft type characteristics and this information can be communicated on the display as well.

At some airports all of the visual docking guidance system units are connected to a central computing system (typically contained on a central server located at the airport). The function of the central computing system is to convey information about the layout of the airport, the layout of the gates, and the movement of aircraft on the airside maneuvering paths.

The operator can, for example, give directions to pilots in the various aircraft, can give instructions to ground crew, and can assign aircraft to specific gates, if not already assigned. The operator can also change visual docking guidance system unit configurations via changing operational parameters of the configuration used by a particular visual docking guidance system unit by routing such parameter changes, made by the operator at the operator station, through the central computing system, to the particular visual docking guidance system unit.

The central computing system has several functionalities. For example, it controls a number of docking controllers, image capture devices, and sensors that are part of a visual docking guidance system units and acts as a communicative connection between the operator stations, visual docking guidance system units, and the digital twin host.

Information that may be provided by the digital twin host includes connectivity configuration information between a particular visual docking guidance system unit and the central computing system. For example, Internet credentials, Internet Protocol information, and other connectivity parameters can be some information that can quickly be provided, if a visual docking guidance system unit fails or is replaced.

The digital twin can also provide operator station configuration information, such as IP address, security information, certificates, name and date information, and current system status, in some embodiments. Also can monitor the certificate expiry dates and provide early alerts.

To populate this information in the digital twin, the operator selects, via the operator station, the types of items to be maintained in the digital twin host and then that information is retrieved and copied from its current location along with data regarding where the information copied is to be placed in relation to the new unit software once a recovery from a failure or replacement of a unit has occurred.

The copied information is then retrieved and copied again, periodically, to update the twin with the most current information. In this manner, recovery from a failure or unit replacement can bring the system as close to operating the way it was before the failure or replacement, as can be and as soon as it can be accomplished.

The twin is not an exact copy of the visual docking guidance system software being recovered, but rather saved customized, operational parameters and computing device executable instructions to locate where, in memory, each parameter is to be placed within the visual docking guidance system software. Accordingly, the recovery process would first restart the current version or load the updated version of the visual docking guidance system software, the operator would select a visual docking guidance system unit digital twin parameter data set to implement at a particular visual docking guidance system unit, and then the digital twin agent will be executed to modify the data of the particular visual docking guidance system software that corresponds to the selected digital twin.

In some embodiments, this configuration data can be reused for similar gates with similar configuration data features. This can result in reduced modifications of the similar gates needing updates, which helps in airport expansion with new gates and other situations, such as, where updates to multiple similar gates is needed.

In the following detailed description, reference is made to the accompanying drawings that form a part hereof. The drawings show, by way of illustration, how one or more embodiments of the disclosure may be practiced.

These embodiments are described in sufficient detail to enable those of ordinary skill in the art to practice one or more embodiments of this disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 212 in FIG. 2.

As used herein, "a" or "a number of" something can refer to one or more such things. For example, "a number of gate areas" can refer to one or more gate areas.

FIG. 1 illustrates a component view of a visual docking guidance system accordance with one or more embodiments of the present disclosure. As illustrated, an airport can have many gate areas 104, where aircraft 102 individually park to embark and disembark passengers and flight crew, refuel, resupply, clean the aircraft, load and unload cargo, and other functions between flights.

A visual docking guidance system unit 106 assists in providing information to the grounds crew workers and/or to the flight crew. This includes flight information, such as flight number and airline and arrival time, and can provide real-time guidance to the flight crew for proper placement of the aircraft within the gate area.

In embodiments of the present disclosure, the visual docking guidance system units are communicatively connected to a central computing system 108 that allows operators at a number of operator stations to monitor and provide directions/instructions/information to the various aircraft 102, gate areas 104, and visual docking guidance system units 106.

The operator stations include a computing device with processor and memory and software accessed thereon for monitoring aircraft, gate areas, and/or visual docking guidance system units. Typically, these devices include a user interface (computer monitor) and a user input (keyboard, touch screen display). This allows the operator to send directions/instructions to the aircraft, update information presented on the visual docking guidance system unit display, update the visual docking guidance system software or make changes to parameters thereof, among other functions.

As mentioned above, the visual docking guidance system units can include one or more cameras and/or sensors for guiding the aircraft to the correct position and orientation within the gate area and/or can also identify the aircraft type. In some implementations, these cameras and/or sensors may have specific parameters set by the operator that, if a visual docking guidance system unit were to go offline, the data regarding these parameters would be lost. Examples of parameters include, by are not limited to: camera direction, camera tilt, camera zoom, point cloud density, calibration parameters, and other parameter data.

The system 100 also includes a digital twin host 110. The digital twin host can include a digital twin agent that is a software program that executes the digital twin process. The digital twin host can also store data regarding parameters to be sent to a visual docking guidance system unit, the central computing system 108, and/or the operator stations 112, as will be discussed in more detail with respect to FIG. 2.

In some implementations, the data can be stored at a remote location on a computing device, such as a cloud server 114. In some embodiments, the remote computing device can be synced with the data on the host 110 to provide an up to date back up of the digital twin data. Further, in some embodiments, the central computing system can have one or more redundant backup servers or the software can be distributed on multiple devices to reduce downtime if the primary central computing system goes offline or has some other issue.

If a visual docking guidance system unit or operator station unit fails or is replaced, the digital twin agent can be informed of the particular visual docking guidance system unit or operator station unit that needs digital twin data. An operator then selects that particular unit as needing digital twin data. The digital twin agent then searches and locates the data for the identified unit and sends the data to the central computing system 108 for routing to the identified unit. In some embodiments, the digital twin agent can also send installation software with the data. The installation software includes executable instructions for placing particular pieces of data in correct locations in memory related to the parameters of the identified unit.

Figure 2:
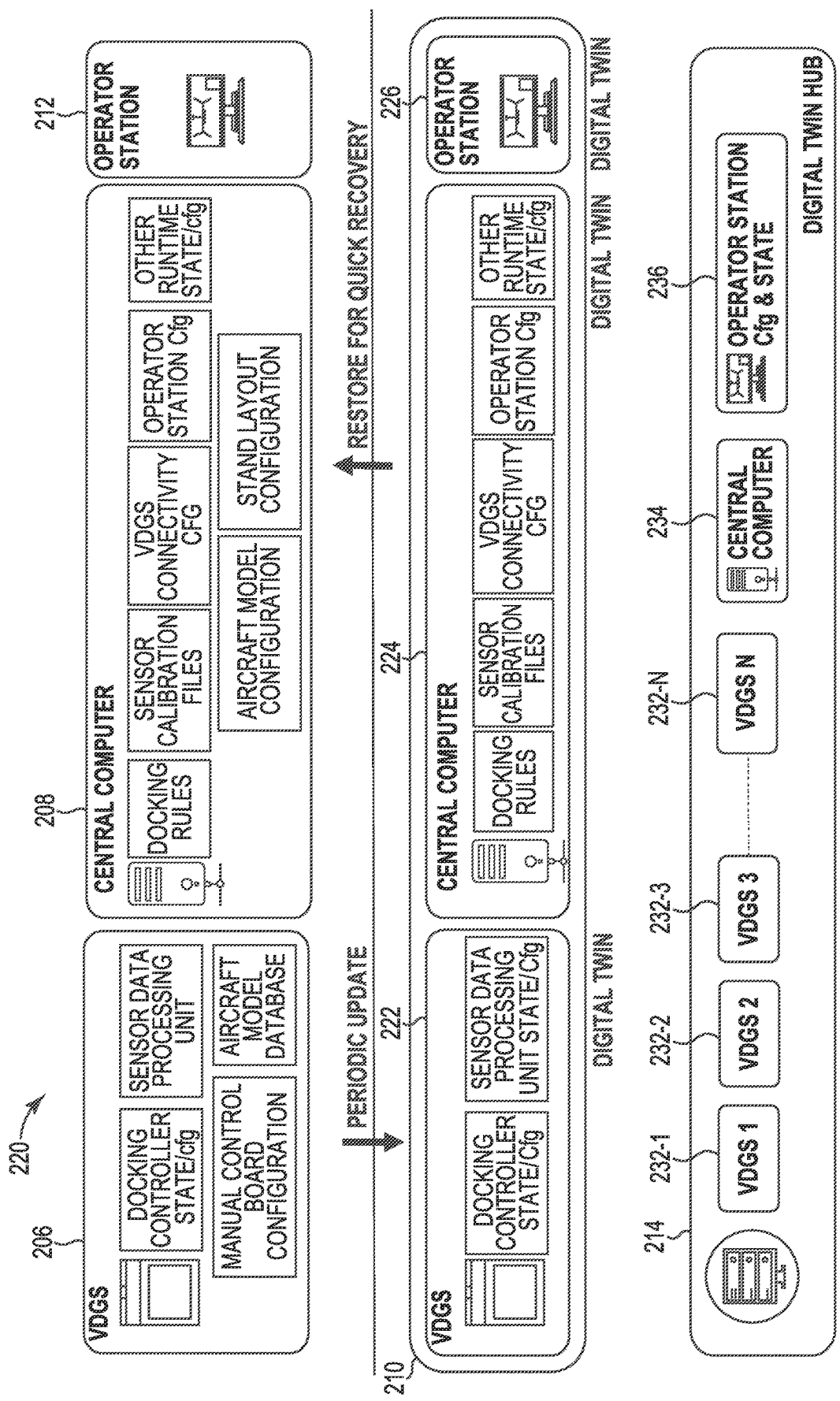
FIG. 2 illustrates a schematic view of a visual docking guidance system in accordance with one or more embodiments of the present disclosure.

FIG. 2 illustrates a schematic view of a visual docking guidance system in accordance with one or more embodiments of the present disclosure. In the system shown in FIG. 2, the system 220 includes a number of visual docking guidance system unit 206, a central computer 208, and an operator station 212.

The visual docking guidance system units each include docking controller parameters including status information and configuration information (cfg). The visual docking guidance system units each also can, for example, include sensor data processing unit status information and configuration information, manual control board information, and an aircraft model database.

The docking controller includes the operation parameters for the display and the information presented on the display. Parameters can include size, color, and orientation of the presented content, and content types that are selected to be presented among other parameters.

The sensor data processing unit can be a sensor/camera that captures still images, video, RADAR, LIDAR, or other imaging techniques. As discussed above, parameters can include, but are not limited to tilt, zoom, pan, field of view, point density, etc.

This parameter data can be periodically loaded, via the central computing system, to a storage area 222 for visual docking guidance system parameter data in the digital twin host computing device 210. In this manner, the parameters are ready for quick recovery when needed due to a failure of a visual docking guidance system unit or a replacement of a unit.

Likewise, in some embodiments, parameters of the central computing system 208 can be provided to the digital twin to be used upon failure or replacement of a central computing system unit. As illustrated in FIG. 2, this can, for example, include docking rules parameters, general sensor calibration files, visual docking guidance system unit connectivity configuration parameters, operator station configuration parameters, aircraft model configuration parameters, stand layout configuration parameters, and other runtime state or configuration parameters. These parameters can, for example, be stored in their own memory location 224 in the digital twin host 210.

Further, in various embodiments, parameters of the one or more operator stations 212 can be provided to the digital twin, via the central computing system, to be used upon failure or replacement of an operator station unit. This can, for example, include display parameters, operator preference parameters (e.g., for layout of information presented to the operator on the display of the operator station), and other runtime state or configuration parameters (e.g., alert states and actions, security parameters, etc.). These operator station parameters can, for example, be stored in their own memory location 226 in the digital twin host 210.

Additionally, in some implementations, the digital twin parameter data can be stored in a remote location on a computing device 214. In some embodiments, the digital twin computing server can be virtual or physical in nature. In this example, each visual docking guidance system unit has its parameters stored in a different memory storage location 232-1 through 232-N, with data for the parameters of the central computing system stored at 234 and the operator stations stored at 236.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for recovering a device of a visual docking guidance system, comprising:
   identifying that a device of the visual docking guidance system is non-responsive;
   determining which device of the visual docking guidance system is non-responsive;
   initiating a start-up of one visual docking guidance system program on the device that was non-responsive, the program selected from: a visual docking guidance system program, a central computing system program, or an operating station program;
   selecting a digital twin parameter data set corresponding to the device of the visual docking guidance system that was non-responsive, wherein the set includes parameter data that was customized by a user of the visual docking guidance system and is particular to the device of the visual docking guidance system that was non-responsive; and
   sending the digital twin parameter data set to the device of the visual docking guidance system that was non-responsive to update one or more parameters stored in association with the visual docking guidance system program.

2. The method of claim 1, wherein prior to identifying that a device of the visual docking guidance system is non-responsive, the method includes populating a digital twin parameter data set by selecting a number of types of items to be included in the digital twin parameter data set.

3. The method of claim 2, wherein the method further includes identifying where the items are to be placed in relation to software on the device of the visual docking guidance system that was non-responsive or new device software once a replacement of the non-responsive unit has occurred.

4. The method of claim 2, wherein populating a digital twin parameter data set by selecting a number of types of items to be included in the digital twin parameter data set, includes populating multiple digital twin parameter data sets such that each data set corresponds to a different visual docking guidance system unit.

5. The method of claim 2, wherein populating a digital twin parameter data set by selecting a number of types of items to be included in the digital twin parameter data set, includes populating multiple digital twin parameter data sets such that each data set corresponds to a different operator station unit.

6. The method of claim 2, wherein populating a digital twin parameter data set by selecting a number of types of items to be included in the digital twin parameter data set, includes selecting at least one item type for a visual docking guidance system unit from the item types including: docking controller state data, docking controller configuration data, sensor data processing unit state data, and sensor data processing unit configuration data.

7. The method of claim 2, wherein populating a digital twin parameter data set by selecting a number of types of items to be included in the digital twin parameter data set, includes selecting at least one item type for a central computing system device from the item types including: docking rules data, sensor calibration data, visual docking guidance system unit connectivity configuration data, and operator station configuration data.

8. The method of claim 1, wherein the digital twin parameter data set includes state information of each of the visual docking guidance system units, the central computing system, and operator station.

9. The method of claim 1, wherein the digital twin parameter data set includes at least one of: digital certificates, airport layout, algorithm configuration for each visual docking guidance system, obstacle detection rules, wing collision rules, middle line adjustment parameters, camera calibration, camera adjustment parameters, sensor calibration, and sensor adjustment parameters.

10. The method of claim 1, wherein the digital twin parameter data set includes at least one of: data selected from the data types including: system configuration details, network topology, and application configuration details.

11. The method of claim 1, wherein the digital twin parameter data set includes data related to connectivity configuration information for communication between two of: the central computing system device and a visual docking guidance system unit or the operator station unit.

12. A digital twin device for recovering a device of a visual docking guidance system, the digital twin device having a processor and memory, wherein the memory has instructions executable by the processor to:
   identify that a device of the visual docking guidance system is non-responsive;
   determine which device of the visual docking guidance system is non-responsive;
   select a digital twin parameter data set corresponding to the device of the visual docking guidance system that was non-responsive, wherein the set includes digital twin parameter data that was customized by a user of the visual docking guidance system and is particular to the device of the visual docking guidance system that was non-responsive; and
   send the digital twin parameter data set to the device of the visual docking guidance system that was non-responsive to update one or more parameters stored in association with the visual docking guidance system program.

13. The device of claim 12, wherein the digital twin device includes computer executable instructions to send the digital twin parameter data set after a start-up of one visual docking guidance system program selected from: a visual docking guidance system software program, a central computing system program, or an operating station program, is initiated.

14. A digital twin system for recovering a device of a visual docking guidance system, the digital twin system comprising:
   a visual docking guidance system, comprising:
      a number of visual docking guidance system units;
      a central computing server communicatively connected to the visual docking guidance system units; and
      a number of operator stations communicatively connected to the central server; and a digital twin device communicatively connected to the central server wherein the digital twin device includes a digital twin agent and a set of parameter data that was customized by a user of the visual docking guidance system and is particular to a device of the visual docking guidance system that was non-responsive; and the digital twin device sending the digital twin parameter data set to the device of the visual docking guidance system that was non-responsive to update one or more parameters stored in association with the visual docking guidance system program.

15. The system of claim 14, wherein the visual docking guidance system units, the central computing server and operator stations are located at an airport facility and wherein the digital twin system further includes a remote device that is communicatively connected to the digital twin device and receives the digital twin parameter data set from the digital twin device.

16. The system of claim 15, wherein the digital twin agent on the digital twin device is a first digital twin agent and wherein at least one of the visual docking guidance system units, the central computing server or operator stations includes a second digital twin agent.

17. The system of claim 16, wherein the second digital twin extracts data that is to be part of the digital twin parameter data set on the first digital twin agent from the device, server, or unit on which the second digital twin agent resides.

18. The system of claim 16, wherein the second digital twin agent includes computer executable instructions to receive the digital twin parameter data set from the first digital twin agent and install the digital twin parameter data set on the device, server, or unit on which the second digital twin agent resides.

19. The system of claim 14, wherein the digital twin parameter data in the digital twin system is secured via encryption or digital signature technology.

20. The device of claim 14, wherein the operator station includes a computing device with processor and memory and software accessed thereon for monitoring aircraft, gate areas, and/or visual docking guidance systems.

\* \* \* \* \*